L. J. KUNICK.
CHEESE CUTTER.
APPLICATION FILED NOV. 9, 1908.
922,156.
Patented May 18, 1909.
2 SHEETS—SHEET 1.
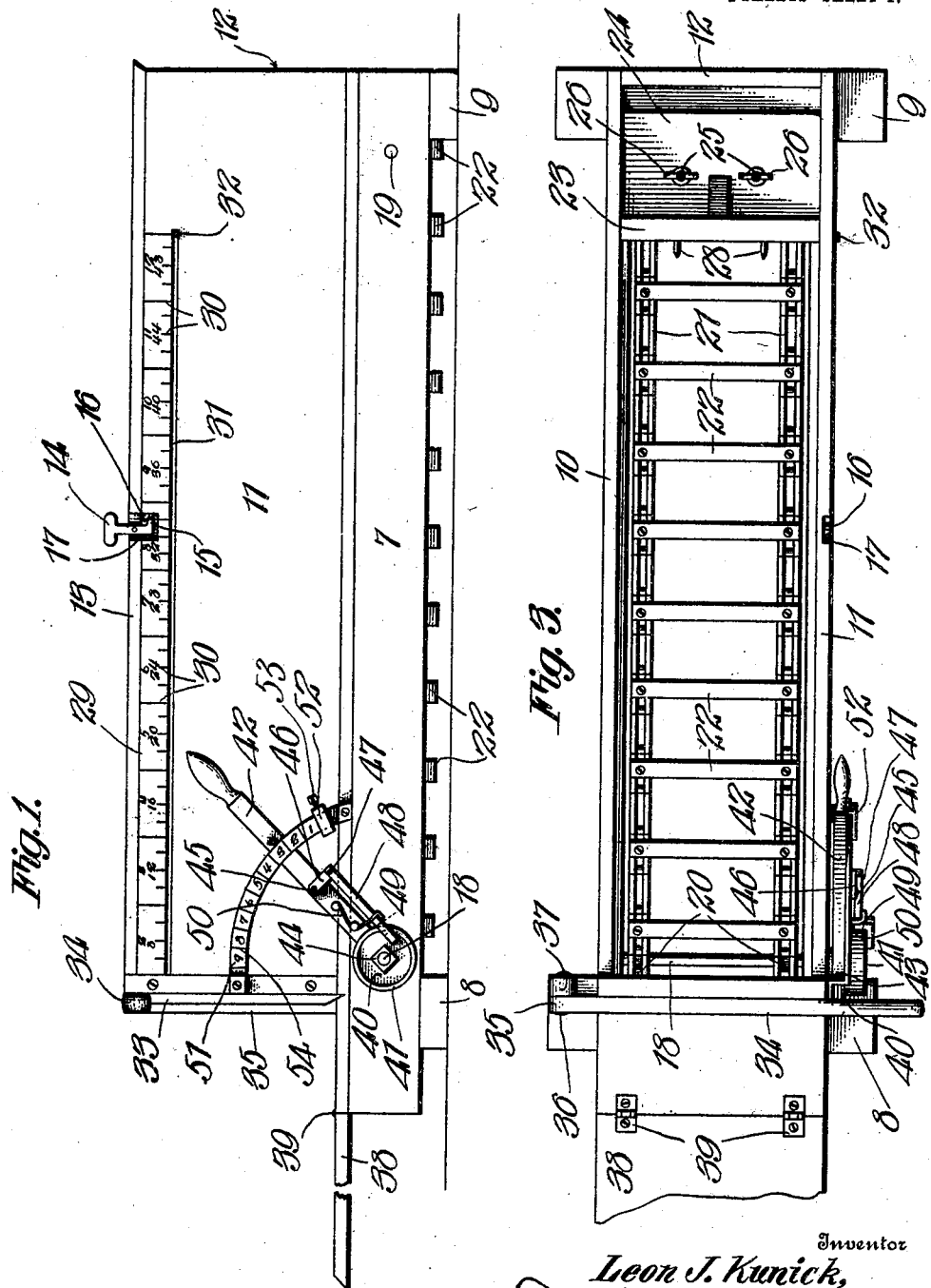
Witnesses
Chas. C. Richardson,
F. O. Fauber
Inventor
Leon J. Kunick,
By
Attorneys.

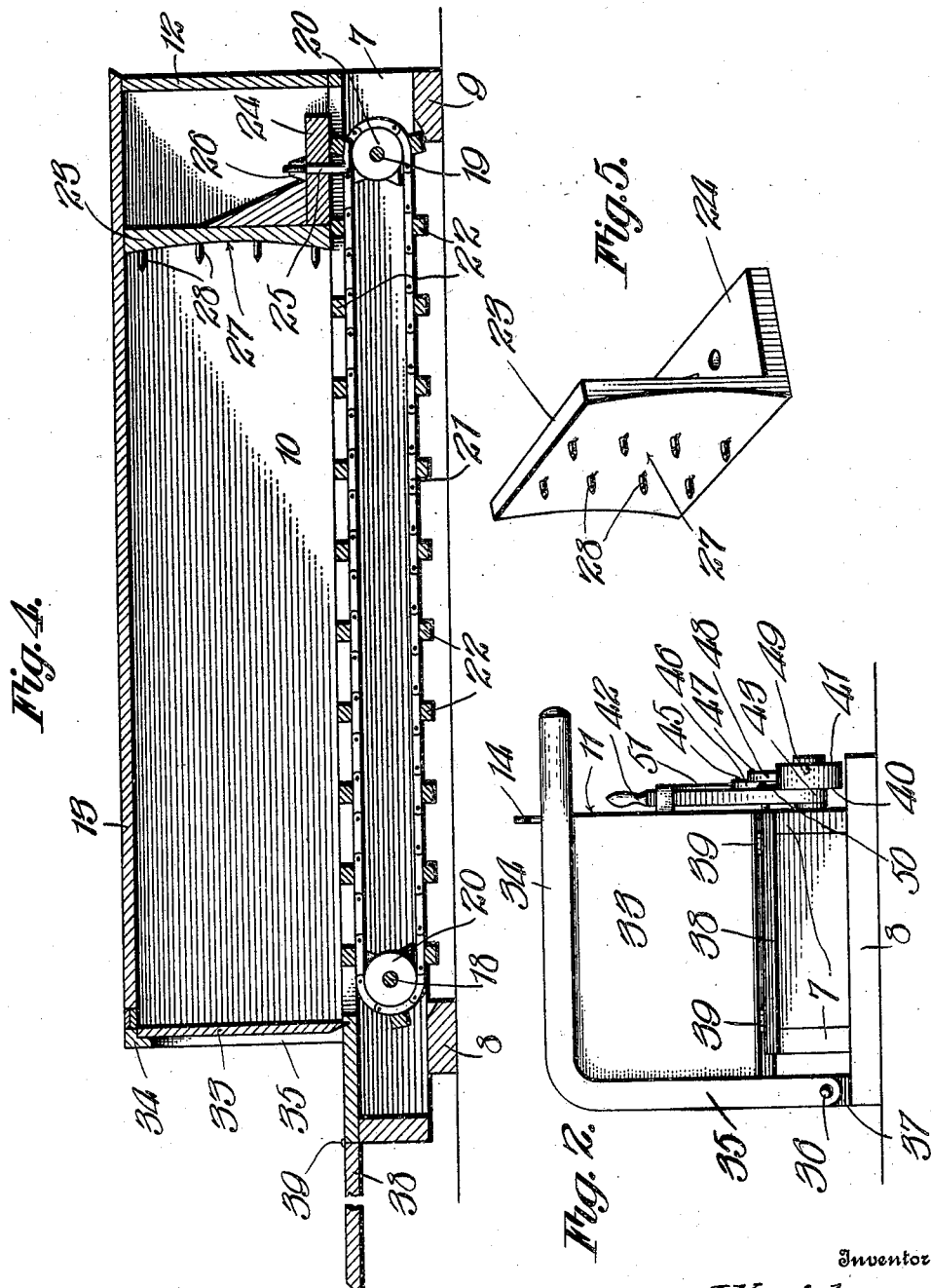

UNITED STATES PATENT OFFICE.

LEON J. KUNICK, OF RUTLAND, ILLINOIS.

CHEESE-CUTTER.

No. 922,156.  Specification of Letters Patent.  Patented May 18, 1909.

Application filed November 9, 1908. Serial No. 461,778.

*To all whom it may concern:*

Be it known that I, LEON J. KUNICK, a subject of the Czar of Russia, residing at Rutland, in the county of Lasalle, State of Illinois, have invented certain new and useful Improvements in Cheese-Cutters; and I do hereby declare the following to be a full, clear, and exact description of the invention, such as will enable others skilled in the art to which it appertains to make and use the same.

The invention relates to a cheese cutter and more particularly to the class of devices for feeding and cutting cheese into portions of uniform weight, size or value.

The primary object of the invention is the provision of a cheese cutter which comprises a frame structure supporting an endless conveyer mechanism upon which a cheese body is supported, means for imparting movement to the conveyer to move the same at predetermined distances so as to permit the cheese body to be fed from one end of the frame structure into proportions of uniform size, weight or value and cutting means adapted to sever the cheese body for separating the same into like portions namely, predetermined sizes, weight or value.

Another object of the invention is the provision of a cheese cutter comprising a frame having a conveyer adapted to feed cheese or the like to be subsequently severed into portions of uniform size or weight, a follower means detachably connected to the conveyer to cause positive feed of the cheese, a graduating scale arranged on the frame and a pointer carried by the follower means and cooperative with the scale to indicate the amount of cheese fed from the frame, and manually operable means to operate the conveyer for moving the same in one direction at predetermined distances.

A further object of the invention is the provision of a cheese cutter provided with a scale arranged longitudinally of the device and an indicator connected with the means for feeding the cheese to the knife so that it will indicate directly the extent of movement of the cheese in order to obtain a slice or portion thereof possessed of a predetermined size or value.

A still further object of the invention is the provision of a cheese cutter in which the conveyer mechanism will move in a uniform manner, the latter supporting a follower to advance the cheese upon movement of the conveyer, means for actuating the conveyer to move the same at predetermined distances with respect to a knife which is adapted to sever the cheese in portions of predetermined weight or size, and an indicator adapted to disclose the extent of movement of the cheese by the conveyer for accurately determining the size or portion thereof to be severed.

With these and other objects in view the invention for example consists in the construction, combination and arrangement of parts or elements as will be hereinafter more fully described, illustrated in the accompanying drawings and brought out in the appended claims. However, it is to be understood that changes, variations and modifications may be made, such as come properly within the scope of the appended claims without departing from the spirit of the invention.

In the drawings; Figure 1 is a side elevation of the invention with the side wall of the frame partly broken away to show in detail the catch member and manner of locking the hinged cover or top in a closed position. Fig. 2 is a front end elevation. Fig. 3 is a top plan view with the hinged cover or top removed. Fig. 4 is a longitudinal sectional view through the frame. Fig. 5 is a detail perspective view of the follower means detached from the conveyer.

Similar reference characters indicate corresponding parts throughout the several views in the drawings.

In the drawings there is shown a frame or casing which is formed of spaced longitudinal side bars or beams 7 the latter mounted upon front and rear cross bars or beams 8 and 9 and fixed to the longitudinal bars or beams are vertical side walls 10 and 11 to which latter is connected a rear end wall 12 and to the side wall 10 is hinged a cover or top 13 the latter having pivoted thereto a catch member 14 having a hook 15 to engage a pin 16 projecting in a recess 17 formed in the side wall 11 and when the said hook 15 is in engagement with the pin 16 it will hold the cover or top in a closed position.

Near opposite ends of the frame and journaled in the longitudinal bars or beams 7 are rotary horizontally disposed shafts 18 and 19 and fixed upon these shafts are spaced sprocket wheels 20 over which is trained an endless conveyer comprising sprocket chains 21 engaging the said sprocket wheels and mounted upon the said chains at suitable intervals apart are horizontally disposed supporting bars or slats 22, the same adapted to support a block, brick or body of cheese when placed within the casing.

Mounted upon the endless conveyer is a follower means comprising a vertical plate 23 the latter having fixed to its lower end a pair of rearward extensions 24 in which are mounted hook members 25 which latter are adapted to engage a pair of slats 22 and which members carry threaded thumb nuts 26 to detachably lock the follower means to the endless conveyer so that the brick or body of cheese will be positively fed forwardly in a direction to the front end of the casing. The forward face of the plate 23 is concaved as at 27 and having projecting therefrom a plurality of spurs or pins 28 to engage in the end of the brick or body of cheese so as to prevent the same from being displaced in the casing or frame.

On the outer face of the side wall 11 and at the top edge thereof is mounted a scale plate 29 the latter extending throughout the longitudinal extent of the casing and is provided with graduating marks as at 30 to indicate the length of a brick or body of cheese when mounted within the casing. Immediately below the lower edge of the scale plate 29 is a longitudinal slot 31 through which projects an indicator or pointer 32 fixed and projecting from the top edge of the follower plate 23. This pointer 32 is adapted to overlie the scale plate 29 so as to record and indicate by the graduating marks 30 the extent of feed or advancement of the endless conveyer which latter causes the advancement of the cheese body to be subsequently severed into predetermined portions, weight or value as will be hereinafter described.

At the open front end of the casing is mounted a cutting element comprising a knife or blade 33 which latter has its upper edge connected to a handle 34 the same projecting to one side of the frame or casing and is provided with a right angular depending extension or arm 35 the lower end of which is pivoted as at 36 to an ear 37 rising from and fixed to one of the longitudinal beams 7 of the casing. The cutting element is adapted to sever a slice or portion from the cheese body when the latter is fed at predetermined distances outwardly from the front end of the casing and this cutting element is adapted to normally close the open front end of the casing.

At the front end of the casing or frame is a platform 38 the same hinged as at 39 to the forward ends of the longitudinal beams 7 and which platform is adapted to swing from a substantially vertical position to a horizontal plane so as to support the severed slices or portions of the cheese body when cut or severed by the cutting element.

To the front shaft 18 upon its end projecting exteriorly to one side of the casing is fixed a wheel 40 the latter having a peripheral annular side flange 41 and to the inside of the said wheel 40 is arranged a manually operable crank or handle member 42 the lower end of which is formed with a sleeve 43 which loosely engages the projecting end of the shaft 18 and is held against detachment from the latter by a nut 44 carried upon the said shaft end. Upon said handle member or crank is pivoted as at 45 one end of a link 46, the opposite end of which is pivoted as at 47 to the upper end of a pawl 48 the latter having in its lower end a recess 49 to receive the peripheral or annular flange 41 of the wheel 40. Carried by the handle member or crank 42 is a spring 50 the latter acting upon the pawl 48 so that upon movement of the crank or handle 42 in one direction, the pawl 48 will be free to slide on the annular flange 41 so as to prevent the wheel from being rotated in the direction of movement of the crank or handle member. Upon movement of the crank or handle member 42 in an opposite direction the pawl 48 will be caused to lock with the wheel 40 by having its recess 49 pinch or engage with the annular flange 41 to rotate the said wheel and thus cause the endless conveyer to be moved in a direction to advance the block or body of cheese so that the latter will protrude at predetermined distances through the open front end of the casing, and be subsequently severed by the cutting element. The spring 50 serves to maintain the pawl 48 yieldably in one of its positions and causes it to operate instantly when the handle member is shifted or moved in one direction. It is obvious that when the handle member or crank is moved in an opposite direction it will have no effect upon the endless conveyer.

Fixed to the side wall 11 at the front end of the casing is a segment bar 51 having a stop 52 slidably disposed thereon and provided with a set screw 53 whereby the stop may be locked at any desired point upon the segment, the stop disposed in the path of movement of the crank or handle member 42 and operates to limit the movement of the latter. The said segment 51 is provided with graduations 54 to indicate the portion or size of slices to be severed from the body or brick of cheese by the cutting element and this is effected by having the crank or handle member moved into register with any one of the desired graduation marks and in doing this the cheese body is fed from the open end of the casing to a predetermined extent corresponding to the movement of the crank or handle member from one graduation mark to another about the segment.

What is claimed is—

1. In a cheese cutter, a casing having an elongated slot in one side thereof near its top, a transversely slatted endless conveyer arranged to travel with the casing, a concave follower plate having a rear extension at right angles thereto resting upon a pair of the slats of the conveyer, detachable hook members carried by the extension and engaging one of the slats to secure the follower to the conveyer, a scale secured exteriorly of the casing above the slot, and a pointer secured to the follower and projecting through the slot to register with the scale.

2. In a cheese cutter, a casing having an elongated slot in one side thereof near its top, a transversely slatted endless conveyer arranged to travel with the casing, a concave follower plate having a rear extension at right angles thereto resting upon a pair of the slats of the conveyer, detachable hook members carried by the extension and engaging one of the slats to secure the follower to the conveyer, a scale secured exteriorly of the casing above the slot, a pointer secured to the follower and projecting through the slot to register with the scale, and a manually operable cutter member arranged at one end of the casing and normally closing the same.

3. In a cheese cutter, a casing having an elongated slot in one side thereof near the top, a transversely slatted endless conveyer arranged to travel with the casing, a concave follower plate having a rear extension at right angles thereto resting upon a pair of the slats of the conveyer, detachable hook members carried by the extension and engaging one of the slats to secure the follower to the conveyer, a scale secured exteriorly of the casing above the slot, a pointer secured to the follower and projecting through the slot to register with the scale, a normally operable cutter member arranged at one end of the casing and normally closing the same, a wheel adapted to impart movement to the conveyer, and having a peripheral annular side flange, a manually operable crank, a pawl linked to said crank and having a recess to engage the annular flange for turning the wheel when the crank is actuated in one direction.

In testimony whereof, I affix my signature, in presence of two witnesses.

LEON J. KUNICK.

Witnesses:
   FRED W. SAUER,
   FRANK CALUETTI.